United States Patent [19]

Edgar et al.

[11] 3,926,924

[45] Dec. 16, 1975

[54] POLYAMIDE COPOLYMERS FROM HEXAMETHYLENE DIAMMONIUM ADIPATE/TEREPHTHALATE AND A THIRD POLYAMIDE FORMING REACTANT

[75] Inventors: Owen Burchell Edgar, Manchester; Michael Richard Yates, Leeds, both of England

[73] Assignee: Imperial Chemical Industries Ltd., London, England

[22] Filed: Oct. 18, 1973

[21] Appl. No.: 407,679

Related U.S. Application Data

[63] Continuation of Ser. No. 201,966, Nov. 24, 1971, abandoned, which is a continuation of Ser. No. 578,521, Sept. 12, 1966, abandoned.

[30] Foreign Application Priority Data

Sept. 16, 1965 United Kingdom............... 39587/65

[52] U.S. Cl.............. 260/78 R; 161/177; 260/78 A; 260/78 L; 260/78 S; 264/177 F
[51] Int. Cl.²....................C08G 69/26; C08G 69/14; C08G 69/08
[58] Field of Search............... 260/78 R, 78 A, 78 L

[56] References Cited

UNITED STATES PATENTS

| | | | |
|---|---|---|---|
| 2,252,555 | 8/1941 | Carothers........................... | 260/78 R |
| 2,913,433 | 11/1959 | Wittbecker........................ | 260/78 R |
| 2,918,454 | 12/1959 | Graham............................. | 260/78 R |
| 3,145,193 | 8/1964 | Gabler.............................. | 260/78 R |
| 3,308,221 | 3/1967 | Opfell................................ | 264/174 |
| 3,351,205 | 11/1967 | Butler et al......................... | 161/143 |
| 3,380,968 | 4/1968 | Ridgway............................ | 260/78 R |
| 3,621,089 | 11/1971 | Edgar et al........................ | 260/78 S |

OTHER PUBLICATIONS

Oronite Chemical Co. – Oronite Isophthalic; Apr. 1955, Bulletin No. 10.

*Primary Examiner*—Harold D. Anderson
*Attorney, Agent, or Firm*—Andrew F. Sayko, Jr.

[57] ABSTRACT

A ternary fibre forming copolyamide consisting essentially of the polymeric condensation product of (1) at least 50 percent by weight of hexamethylene diammonium adipate, (2) 20–40 percent by weight of hexamethylene diammonium terephthalate and (3) 2–20 percent by weight of a third polyamide.

3 Claims, 2 Drawing Figures

U.S. Patent   Dec. 16, 1975   3,926,924
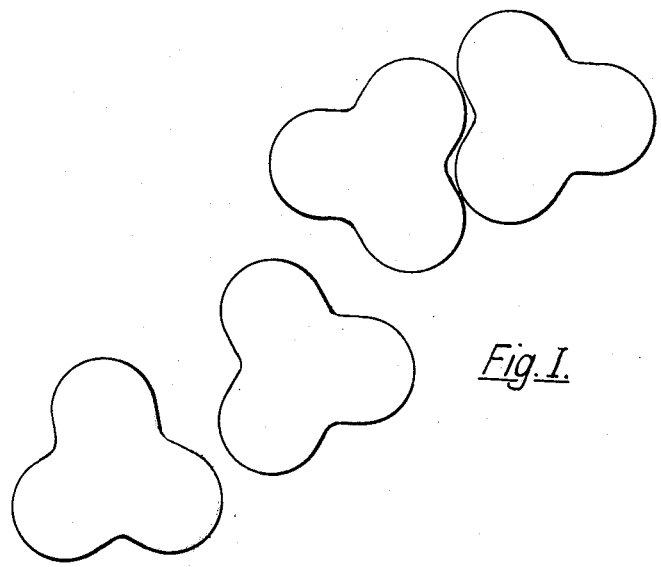
Fig. I.
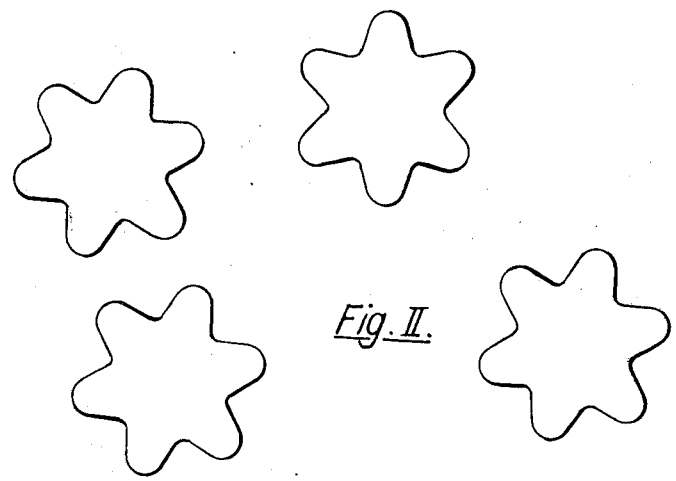
Fig. II.
Inventors
OWEN BURCHELL EDGAR
MICHAEL RICHARD YATES
By
Cushman, Darby & Cushman
Attorneys

POLYAMIDE COPOLYMERS FROM HEXAMETHYLENE DIAMMONIUM ADIPATE/TEREPHTHALATE AND A THIRD POLYAMIDE FORMING REACTANT

This application is a continuation of application Ser. No. 201,966 filed Nov. 24, 1971, now abandoned, which is in turn a continuation of Ser. No. 578,521 filed Sept. 12, 1966, now abandoned.

The present invention is concerned with polyamide copolymers and in particular with copolymers of polyhexamethylene adipamide and polyhexamethylene terephthalamide containing a third component (such as polyepsilon caprolactam or polyhexamethylene isophthalamide).

Because of its desirable properties polyhexamethylene adipamide (6.6 nylon) yarn has found wide application in the textile field especially in apparel fabrics. The softening point of the polymer is sufficiently high to prevent undue damage to fabrics by normal domestic washing and ironing but not so high as to produce difficulties at spinning resulting from degradation for example. However for some spinning processes e.g. in the manufacture of filaments having a non-circular cross-section it is desirable that the polymer should have a higher melt viscosity but without any substantial change in softening point.

The melt viscosity of nylon 66 can, of course, be raised by raising its molecular weight, but attempts to raise the molecular weight to any substantial degree frequently result in the occurrence of undesirable cross-linking and discolouring of the polymer.

Alternatively the melt viscosity of nylon 66 can be raised without raising the molecular weight by the incorporation therein of a second high melt viscosity polymer to form a copolyamide. A suitable polyamide for this purpose is polyhexamethylene terephthalamide (6.T nylon). However, although the melt viscosity of 66 nylon can be raised in this manner only a limited amount of 6.T nylon, about 18% can be added before there is an undesirably large increase in softening point of the copolymer in excess of 265°C which makes for problems in spinning.

We have now found that high melt viscosity copolyamides having softening points not substantially greater than 66 nylon i.e. less than 265°C, comprising a major proportion, i.e. at least 50%, of 66 nylon and at least 20% of 6.T nylon can be obtained by adding a third polyamide component to the 6.6/6.T copolymer to depress the softening point. The third polyamide component constitutes a minor proportion of the copolymer, the actual percentage present depending on the relative proportion of 66 and 6.T nylons in the copolymer.

Accordingly therefore the present invention provides a ternary copolyamide comprising a major proportion of polyhexamethylene adipamide together with at least 20% of polyhexamethylene terephthalamide and a minor proportion of a third polyamide.

Preferably the copolyamide should contain 20% to 40% by weight of polyhexamethylene terephthalamide and 2% to 20% and even more preferably 5% to 10% by weight of the third polyamide.

As especially useful third component polyamides for the ternary copolymer there may be mentioned, by way of example only, polyepsilon caprolactam and polyhexamethylene isophthalamide. Polyhexamethylene sebacamide, polyhexamethylene suberamide and poly(w-amino undecanoic acid) may also be used as the third component.

The high melt viscosity copolyamides of this invention are particularly useful in spinning filaments having non-circular cross-section, e.g. a trilobal or star-shaped cross-section, by melt extrusion through profiled spinneret orifices. The filaments so formed tend to retain more faithfully the shape imparted to them by the orifices than do filaments formed from polyamides or copolyamides of lower melt viscosity, which filaments tend to revert to a circular cross-section.

The 6.6/6.T nylon copolymer containing polyhexamethylene isophthalamide (6.i.P. nylon) as the third component is of particular value since it has both a high melt viscosity and also provides filaments having a relatively high initial modulus.

The following examples illustrate the invention but are in no way intended to be limitative thereof. In these examples the percentage compositions in all of the copolyamides were calculated as weight percentages on the fininshed polymers.

EXAMPLES 1 & 2

60 gms. of mixed salts of hexamethylene diammonium adipate hexamethylenediammonium terephthalate and hexamethylene diammonium isophthalate in the correct proportions by weight to yield copolymers of the desired composition were charged into carius tubes together with 10 ml. and 3.5 ml. of distilled water and 1.0 and 0.55 moles of acetic acid stabiliser respectively. The tubes were purged free of oxygen, evacuated, sealed and heated in example 1 for 6 hours at 230°C, and in example 2 at 280°C for 1 hour plus 220°C for 3 hours, in a rocking furnace. The half made polymers were subsequently finished in a 2 inch diameter tube equipped with a stirrer and nitrogen bleed at 285°C for 40 minutes in example 1 and 285°C for 1½ hours, in example 2. The resultant copolymer properties are listed in Table 1.

TABLE 1.

| Example | Properties of 66/6.T/6iP copolymer 1 | 2 |
| --- | --- | --- |
| Copolymers, wt.% ratios of 66/6.T/6iP | 58/31.5/10.5 | 72.8/21.9/5.3 |
| Amine end groups | 28.0 | 36.0 |
| Carboxyl end group equivalents per $10^6$ gms | 89.0 | 92 |
| Acetyl end group equivalents per $10^6$ gms | 44.0 | — |
| Melt viscosity | 3370 poises | — |
| Softening point | 258°C | 255°C |

Melt viscosity was measured using an Epprecht viscometer under an atmosphere of steam at 290°C. The viscosity reading was taken 1 hour after the polymer had been introduced into the apparatus.

Softening point was determined by means of a Vicat penetrometer using a load of 200 gms.

The copolymers were spun on a rod spinner at 300°C. using a 5 circular hole spinneret and drawn over a hot plate at 100°C and 180°C at draw ratios of 4.5 and 5.75 respectively. The properties of the drawn yarns are given in Table 2 below.

TABLE 2

| Physical properties of drawn 66/6.T/6iP copolymer | | |
|---|---|---|
| Example | 1 | 2 |
| Copolymer wt.% ratios of 6.6/6.T/6iP | 58/31.5/10.5 | 72.8/21.9/5.3 |
| Denier | 31.5 | — |
| Tenacity (g/d) | 4.57 | 9.3 |
| Extension to break % | 21.9 | 16.3 |
| Initial modulus (g/d/100 extension) | 43 | 41.3 |
| Boiling water shrinkage (%) | 14.4 | — |

EXAMPLE 3

1707.1 gms. of mixed salts of hexamethylene diammonium adipate hexamethylene diammonium terephthalate and caprolactam, in proportions to give a 61.7/33.1/5.2,66/6.T/6iP copolymer together with 1000 gms of water and 3.25 gms of acetic acid were heated together with stirring in an autoclave under an atmosphere of nitrogen. The temperature of the autoclave was raised to 215°C and the pressure to 250 p.s.i.g. during a period of 1 hour 40 minutes. The pressure was maintained at this level for 1 hour during which time the temperature rose to 240°C and then reduced to 0.p.s.i.g. during the next hour with a further increase in temperature to 282°C. Finally the mixture was kept under steam at atmospheric pressure for 1 hour at 295°C and then extruded into cold water.

The properties of the copolymer are given in Table 3 below.

TABLE 3

| Physical properties of 66/6.T/6 (61.7/33.1/5.2) copolymer | |
|---|---|
| Amine end group equivalents per 10⁶ gms | 44.9 |
| Carboxyl end group equivalents per 10⁶ gms. | 57.5 |
| Melt viscosity | 3686 poises at 290°C |
| Softening point | 255°C. |

Samples of this polymer were charged to a ¾ inch screw extruder and extruded into 6 filament yarns through spinneret plates containing Y-shaped or 6 pointed star-shaped orifices to give trilobal and hexalobal filaments respectively. The yarns were drawn over a hot plate at 100°C. at a draw ratio of 4.25. The properties of the drawn yarns are given in Tables 4 and 5.

TABLE 4

| Properties of trilobal 66/6.T/6 (61.7/33.1/5.2) drawn yarn | |
|---|---|
| Drawn denier | 103.5 |
| Tenacity (g/d) | 4.3 |
| Extension to break (%) | 39.3 |
| Initial Modulus (g/d/100% ext.) | 26.2 |

The cross-section of filaments taken from the yarn is shown in FIG. 1 from which it can be seen that excellent shape retention was obtained.

TABLE 5

| Properties of hexalobal 66/6.T/6 (61.7/33.1/5.2)drawn yarn | |
|---|---|
| Drawn denier | 106.6 |
| Tenacity | 4.6 |
| Extension to break (%) | 29.9 |
| Initial modulus g/d/100% extension. | 28.6 |

A cross section of filaments taken from this yarn is shown in FIG. II good shape retention was again obtained.

The copolyamides of this invention may include the usual additives for polyamides, including delustrants, pigments antioxidents or light stabilisers without materially affecting the properties thereof.

If desired the copolymer may be spun as one component of a heterofilament, another component preferably having a higher shrinkage to yield crimped or crimpable filaments.

The copolymer is also particularly suitable for the manufacture of hollow filaments, its high melt viscosity resulting in a reduced incidence of collapsed filaments.

EXAMPLE 4

71.5 parts by weight of hexamethylene diammonium adipate, 37.9 parts by weight of hexamethylene terephthalate, 5.2 parts by weight of caprolactam, 0.209 parts by weight of acetic acid stabiliser and 75 parts by weight of water were heated together in a sealed autoclave. When the pressure in the autoclave reached 250 p.s.i. steam was allowed to excape to maintain the pressure at that level whilst the temperature was raised to 245°C The pressure was then allowed to fall to atmospheric over a period of 1 hour, the temperature rising to 265°C and the heating continued under steam at atmospheric pressure for a further ½ hour with a further increase in temperature to 272°C. The resultant polymer was extruded into a ribbon, quenched and cut into chips. The polymer was spun into a 20 trilobal filament yarn by extrusion through spinneret orifices having three limbs of length 0.020 inch and width 0.004 inch and subsequently cold drawn. Details of the polymer, spun and drawn yarn properties and of the spinning and drawing conditions are given in Table 4.

TABLE 4.

| Conditions of spinning and drawing and properties of 66/6.T/6 trilobal yarn. | |
|---|---|
| Polymer properties | |
| Wt. percentage of components in finished polymer (6.6/6.T/6) | 61.5/33.4/5.2 |
| Melt viscosity of polymer | 1600 poises |
| Spinning conditions | |
| Speed, f.p.m. | 1255 |
| Temp. °C | 288 |
| Spun yarn denier | 820 |
| Drawing conditions | |
| Draw ratio | 4.22 |
| Speed, f.p.m. | 608 |
| Relative viscosity | 40.0 |

TABLE 4.-continued

| Conditions of spinning and drawing and properties of 66/6.T/6 trilobal yarn. | |
|---|---|
| Drawn yarn properties | |
| Tenacity g/d | 4.2 |
| Extension to break (%) | 28.6 |
| Modification ratio | 2.16 |

Modification ratio is the ratio between the escribed ans inscribed circles which can be drawn around a cross-section of the filaments constituting the yarn.

Polyhexamethylene adipamide having softening point of 255°C and a melt viscosity of 900 poises spun through orifices having three limbs of length 0.020 inch and width 0.003 inch at a spinning speed of 608 f.p.m. and at a temperature of 288°C and drawn under the same conditions as the above copolymer yielded a trilobal yarn having a modification ratio of 1.6.

EXAMPLES 5, 6 & 7

Copolymers of 6.6 and 6.T nylons together with polyhexamethylene suberamide (6.8 nylon), polyhexamethylene sebacamide (6.10 nylon) and poly(w-amino undecanoic acid) (11 nylon) as the third component were prepared and their softening points determined. Details of the compositions of the copolyamides and their softening points are given in Table 5.

TABLE 5

| Copolymers of 6.6/6.T nylon with 6.8 6.10 & 11 nylon | | | |
|---|---|---|---|
| Example | 5 | 6 | 7 |
| Third component | 6.8 | 6.10 | 11 |
| Composition (66/6T/X) | 62.9/26.3/ 10.8 | 56.0/32.3/ 11.7 | 58.4/33.7/ 7.9 |
| Softening point °C | 260 | 253 | 257 |
| Melt viscosity (poises) | 2640 | — | — |

Example 5 was prepared by the procedure described in Example 3, and Examples 6 and 7 by the procedure described in Example 2.

The polymer of Example 5 was melt-spun into a 5 filament yarn at spinning temperature of 288°C and drawn over a hot plate at 120°C at a draw ratio of 4.5. The drawn yarn had a tenacity of 5.6 g/d, an extension at break of 13.0% and an initial modulus of 40.0 g/d/100% extension.

What we claim is:

1. A fibre forming copolyamide consisting essentially of the polymeric condensation product of (1) at least 50% by weight, based on the weight of the copolyamide, of hexamethylene diammonium adipate, (2) 20 – 40% by weight of hexamethylene diammonium terephthalate and (3) 2 – 20% by weight of epsilon caprolactam.

2. A fibre forming copolyamide consisting essentially of the polymeric condensation product of (1) at least 50% by weight, based on the weight of the copolyamide, of hexamethylene diammonium adipate, (2) 20 – 40% by weight of hexamethylene diammonium terephthalate and (3) 2 – 20% by weight of hexamethylene diammonium suferate.

3. A ternary fibre forming copolyamide consisting essentially of (1) 20 – 40% by weight, based on the weight of the copolyamide, of hexamethylene terephthalamide units, (2) at least 50% by weight of hexamethylene adipamide units and (3) 2 – 20% by weight of W-amino undercamide units.

* * * * *